(12) United States Patent
Buechner et al.

(10) Patent No.: US 8,794,097 B2
(45) Date of Patent: Aug. 5, 2014

(54) COMPONENT WITH INNER AND OUTER TEETH AND METHOD FOR MANUFACTURING THE COMPONENT

(75) Inventors: Tobias Buechner, Illingen (DE);
Christian Bauer, Eppelborn (DE);
Wolfgang Mueller, Saarwellingen (DE);
Peter Hoehne, Friedrichsthal (DE);
Klemens Adamski, Saarbrucken (DE);
Martin Meyer, Heusweiler (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 563 days.

(21) Appl. No.: 12/864,326

(22) PCT Filed: Jan. 29, 2009

(86) PCT No.: PCT/EP2009/050971
§ 371 (c)(1),
(2), (4) Date: Jul. 23, 2010

(87) PCT Pub. No.: WO2009/106401
PCT Pub. Date: Sep. 3, 2009

(65) Prior Publication Data
US 2011/0045945 A1    Feb. 24, 2011

(30) Foreign Application Priority Data

Feb. 28, 2008   (DE) .................. 10 2008 000 431

(51) Int. Cl.
*F16H 55/12*   (2006.01)
*F16D 13/68*   (2006.01)
*F16H 63/30*   (2006.01)
*F16H 55/17*   (2006.01)
*F16H 57/08*   (2006.01)

(52) U.S. Cl.
CPC ............ *F16H 55/17* (2013.01); *F16H 63/3026* (2013.01); *F16H 2055/176* (2013.01); *F16D 2250/00* (2013.01); *F16D 13/683* (2013.01); *F16H 57/08* (2013.01)
USPC .............................................. 74/446; 74/449

(58) Field of Classification Search
USPC .................... 74/434, 446, 447, 449, 457, 460
See application file for complete search history.

(56) References Cited

U.S. PATENT DOCUMENTS

| | | | | |
|---|---|---|---|---|
| 153,630 | A | * | 7/1874 | Sweeney ......................... 74/446 |
| 866,364 | A | * | 9/1907 | Hutchins ......................... 57/112 |
| 2,923,166 | A | * | 2/1960 | Brindley et al. .............. 474/152 |
| 3,034,383 | A | * | 5/1962 | Schulte et al. .................. 72/359 |
| 3,118,316 | A | * | 1/1964 | Fulford ......................... 474/162 |
| 3,922,932 | A | | 12/1975 | Maurice et al. |
| 4,077,274 | A | * | 3/1978 | Johnson .......................... 74/425 |

(Continued)

FOREIGN PATENT DOCUMENTS

| | | |
|---|---|---|
| DE | 2 224 650 | 3/1973 |
| DE | 2 310 288 | 6/1974 |

(Continued)

*Primary Examiner* — Justin Krause
(74) *Attorney, Agent, or Firm* — Davis & Bujold, PLLC; Michael J. Bujold

(57) ABSTRACT

A component with inner teeth (3) and outer teeth (6). The component (7) comprising a basic body (2) provided with the inner teeth (3) and a sheet component (5) provided with the outer teeth (6). The sheet component (5) is connected to the basic body (2), during the manufacturing process, by positive interlock in both the tangential and radial directions.

12 Claims, 2 Drawing Sheets

(56) References Cited

U.S. PATENT DOCUMENTS

| | | | |
|---|---|---|---|
| 4,696,200 A * | 9/1987 | Pezzoli | 74/434 |
| 5,669,423 A * | 9/1997 | Adriaen | 139/449 |
| 5,906,135 A * | 5/1999 | Prater | 74/446 |
| 6,035,737 A * | 3/2000 | Prater | 74/446 |

FOREIGN PATENT DOCUMENTS

| | | |
|---|---|---|
| DE | 10 2007 021 194 A1 | 11/2008 |
| FR | 2 208 473 | 6/1974 |
| GB | 1 367 252 | 9/1974 |
| WO | 2008/135396 A1 | 11/2008 |

* cited by examiner

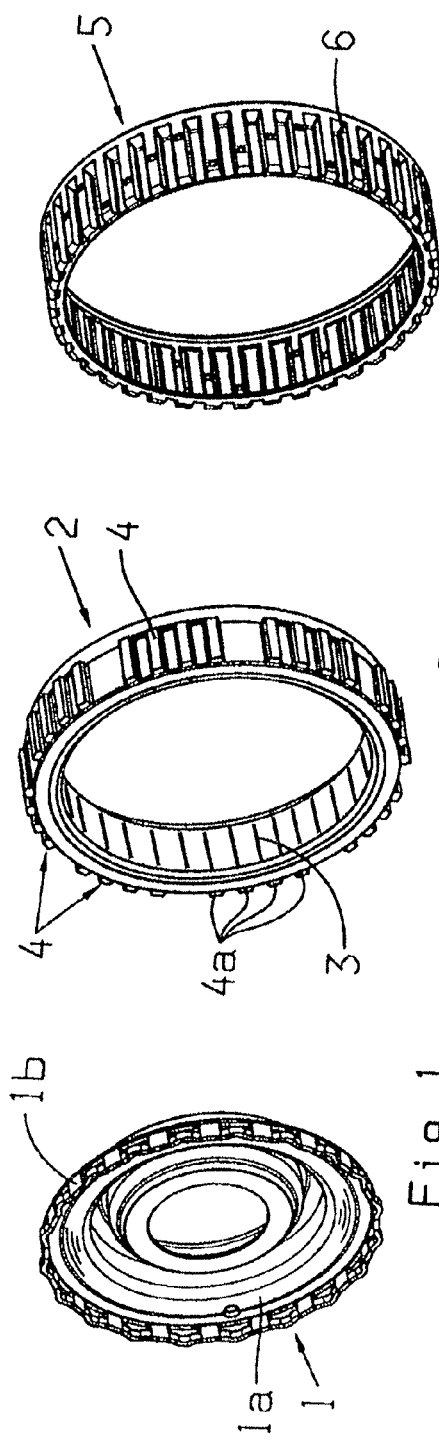
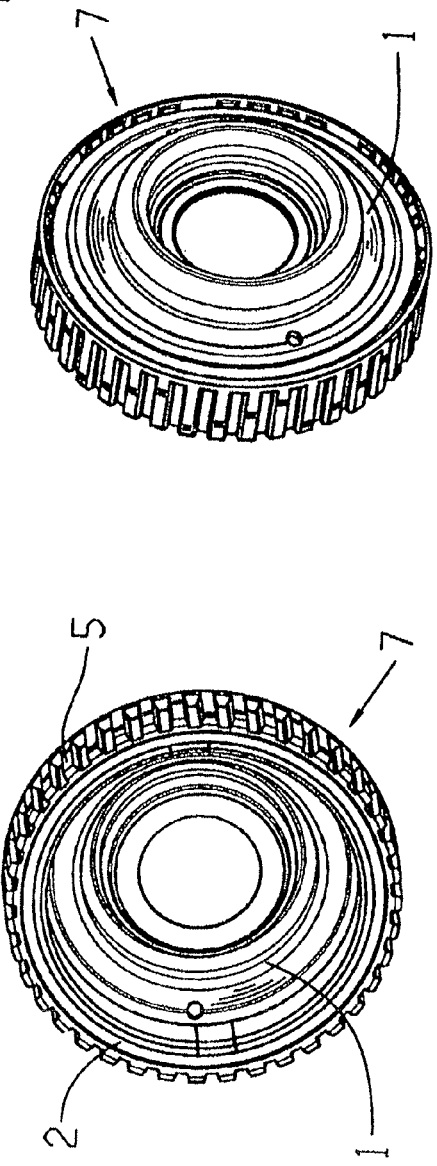

COMPONENT WITH INNER AND OUTER TEETH AND METHOD FOR MANUFACTURING THE COMPONENT

This application is a National Stage completion of PCT/EP2009/050971 filed Jan. 29, 2009, which claims priority from German patent application serial no. 10 2008 000 431.6 filed Feb. 28, 2008.

FIELD OF THE INVENTION

The invention concerns a component with inner and outer teeth, and a method for manufacturing the component.

BACKGROUND OF THE INVENTION

In an older application by the present applicant with official file number DE 10 2007 021 194.7 a component with inner and outer teeth is disclosed, which is produced as a composite structure made from a basic body and an additional component in the form of a sheet element. The component is preferably designed as the ring gear of a planetary transmission and the sheet element as a disk carrier for the disks of a shifting element—for which purpose the sheet element comprises a corresponding carrier profile.

From German patent specification 23 10 288 a planetary transmission with a ring gear is known, which is formed as a toothed rim which engages with planetary gears. The toothed rim is connected with positive interlock in the rotational direction to a drum and is fixed relative to the drum in the axial direction by means of stop elements. Drive in the rotational direction takes place by means of teeth arranged radially on the outside of the toothed rim, which engage in projections on the drum. The drum and its toothed rim functions only as a ring gear and is not designed as a disk carrier.

A disadvantage of the known drum and also of the disk carrier of the older application is that the sheet components provided with a driving profile are relatively weak in the tangential and radial directions, i.e. their shape stability is not great, so at high rotation speeds, under the influence of centrifugal force they tend to "lift off", i.e. the profile flattens and their diameter tends to increase. Consequently, such sheet components are not very resistant to high speeds.

SUMMARY OF THE INVENTION

The purpose of the present invention is to provide a component of the type mentioned at the start, which withstands even higher rotation speeds and maintains its shape. A further purpose of the invention is to provide a method for manufacturing such a component, which enables it to be produced economically.

According to the invention, it is provided that the sheet component is connected to the basic body in the tangential and radial direction with positive interlock. Thanks to the positive connection in the radial direction the sheet component is prevented from deforming under the effect of centrifugal force, since it is held in position by the more rigid basic body. This results in higher resistance to high speeds for the components according to the invention.

In an advantageous design the outer teeth of the sheet component are formed as a driving profile, in which corresponding driving teeth arranged on the basic body engage with positive interlock. The driving teeth on the basic body need not extend over the whole of its circumference, but can be distributed zonally over individual sectors on the circumference. This positive connection between the basic body and the sheet component ensures torque transfer between the two components.

In an advantageous design the driving teeth on the basic body are teeth which are back-tapered or undercut in the area of the tooth base. In this way notches are formed on each side of the tooth base. The driving profile of the sheet component engages in these notches or undercut areas at the bases of the teeth, in such manner that an interlocked connection in the radial direction is formed. Thus, with its driving profile the sheet component conforms to the contour of the driving teeth on the basic body and so forms between adjacent teeth a kind of dovetail connection which prevents radial movement of the sheet component—for example due to the effect of centrifugal force at higher rotation speeds. This radial securing brings the advantage of a greater resistance to high rotation speeds for the component.

In an advantageous design, once the sheet component has been pushed onto the basic body the driving profile can be pressed into the undercut areas by deformation, in particular stretching the material in the tangential direction. This produces an interlocked clamping together of the two components, which is permanent because of the plastic deformation of the sheet component. At the same time, the frictional locking of the two components fixes the sheet component onto the basic body.

In a further advantageous design, the component has two functions: on the one hand the component is designed as a disk carrier, i.e. the inner disks of a disk set for a shifting element, for example a clutch or a brake, engage from the outside in the driving profile. On the other hand, the basic body forms a ring gear with inner teeth, which engage with planetary gearwheels of a planetary transmission. As the material for the basic body, a gearwheel material such as case-hardening steel can preferably be used for making the inner teeth. In contrast, for the disk carrier deep-drawing steel is preferably used. The driving profile is preferably formed as a trapezium profile.

In a further advantageous design the component or ring gear comprises a ring gear carrier which—like the disk carrier—is made as a sheet component, in particular a disk, which is advantageously connected with positive interlock to the basic body. This enables the ring gear with its disk carrier to be produced inexpensively.

The objective of the invention is also achieved by a method. According to the invention, it is provided that the basic body and the sheet component are first made separately, and are then joined. The basic body is preferably made by machining, while the sheet component, in particular its driving profile, are produced without machining, i.e. by deformation.

In an advantageous design, to produce the driving profile a preliminary profile is made first and, once the sheet component has been joined to the basic body, then the final profile is produced, which forms the positive interlock in the radial direction between the basic body and the sheet component. The preliminary profile allows the disk body to be pushed easily onto the basic body (pre-assembly).

Thereafter, by radial blocking or pressing on the concave areas, the material can be stretched in the tangential direction so that the material is forced into the undercut areas at the bases of the teeth. This results in a firm, close and durable clamping of the tooth bases by the driving profile of the sheet component. The method according to the invention is economical, particularly since no machining is involved, and therefore results in low manufacturing costs of the component according to the invention, in particular a transmission component.

BRIEF DESCRIPTION OF THE DRAWINGS

An example embodiment of the invention is illustrated in the drawing and is described in more detail below.

The drawing shows:

FIG. 1: A ring gear carrier (individual component);
FIG. 2: A basic body (individual component);
FIG. 3: A disk carrier (individual component);
FIG. 4: A ring gear with disk carrier (assembly);
FIG. 5: A different view of the ring gear of FIG. 4.

DETAILED DESCRIPTION OF THE PREFERRED EMBODIMENTS

Figure 6:
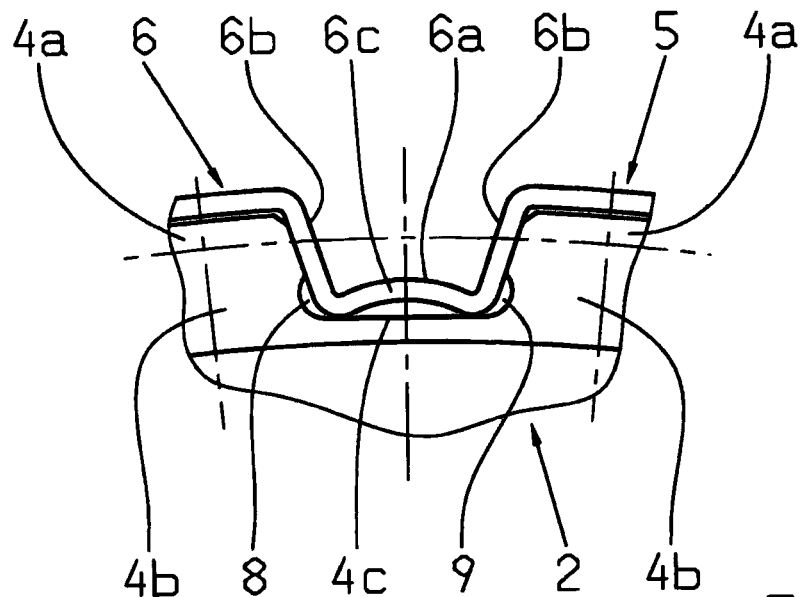
FIG. 6: Partial section through the disk carrier and the basic body before deformation.

FIG. 1 Shows a ring gear carrier 1 formed as a sheet component, illustrated as an individual component. The ring gear carrier 1 is in the form of a disk 1*a* whose circumferential edge is shaped to form a fixing flange 1*b*.

FIG. 2 shows a basic body 2 as an individual component, which is made in the first instance as a cast or forged blank. The basic body 2 has inner teeth 3 whose location is only indicated, which are produced by machining and then case-hardened. On its outer circumference the basic body has individual zones distributed around the circumference, with a carrier tooth array 4 consisting of individual teeth 4*a*.

FIG. 3 shows a disk carrier 5 formed as a sheet component and produced by deformation. The disk carrier 5 has a driving profile 6 which serves for the positively interlocked connection of the inner disks (not shown) of a disk set for a shifting element of a transmission. The driving profile 6 is preferably trapezium-shaped and corresponds to the profile of the driving teeth 4 on the basic body 2.

FIG. 4 illustrates the assembly of the above-mentioned individual components 1, 2 and 5 to form a ring gear 7. The ring gear carrier 1 is connected positively to the basic body 2 by deformation of its flange 1*b*, so that the two components can rotate freely in the rotation direction but are fixed relative to one another in the axial direction. The disk carrier 5 is pushed in the axial direction over the basic body 2, in such manner that the driving teeth zones 4 engage in the driving profile 6 and thereby form a positive connection in the rotation direction.

FIG. 5 shows the ring gear 7 from another perspective, i.e. looking at the outside of the ring gear carrier 1. The ring gear 7 is made as a composite structure, i.e. it comprises two sheet components 1, 5 produced by deformation and the machined basic body 2. In general terms the ring gear 7 is also referred to as the component with basic body inner teeth 3 and outer teeth of the driving profile 6.

FIG. 6 shows a partial section in the area of the driving teeth 4 of the basic body 2 and the driving profile 6 of the disk carrier 5. The teeth 4*a* have back-tapers or undercuts in the area of their tooth bases 4*b*, which are formed as rounded notches in each tooth base 4*b*. A tooth 6*a* of the driving profile 6 engages in each case in the tooth gap between two adjacent teeth 4*a*. The tooth 6*a* has two straight flanks 6*b* and a tooth tip 6*c* with a concave shape (arched upward in the drawing), which forms a hollow space relative to the bottom 4*c* of the driving tooth 4. The concave tooth tip 6*c* profile forms a preliminary profile during the production of the ring gear 7, and with this preliminary profile the disk carriers 5 is pushed onto the driving teeth 4 of the basic body 2.

Figure 7:
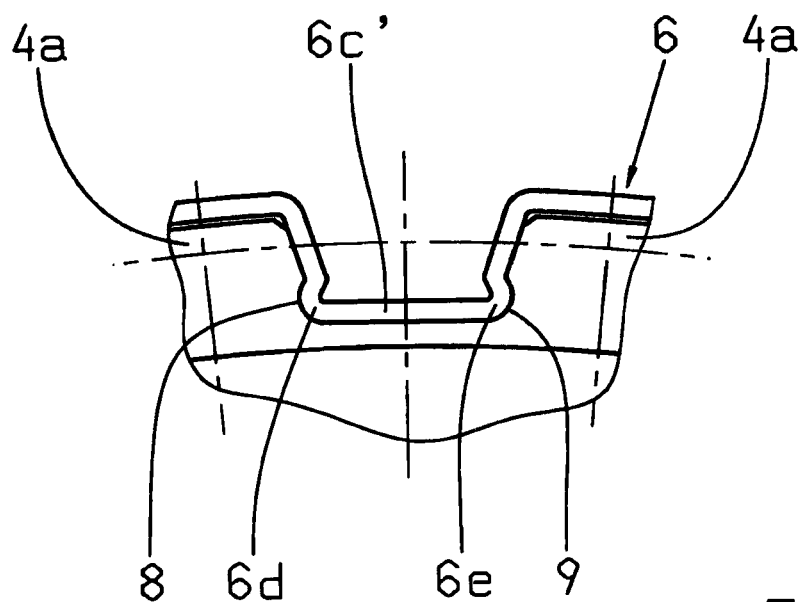
FIG. 7: Partial section through the disk carrier and the basic body, after deformation.

FIG. 7 shows the same partial section as FIG. 6, but after the driving profile 6 has been deformed, i.e. after the concave tooth tip area 6*c* has been stretched, the stretched shape being indexed 6*c*'. By exerting a radially inward-directed force (not shown) on the dome of the concave area 6*c* (FIG. 6), the latter is stretched to a substantially straight position 6*c*' whereby the corner areas are forced as projections 6*d*, 6*e* into the undercut areas 8, 9 at the root of the tooth 4*b*. This produces all-over contact between the driving profile 6 and the driving teeth 4 of the basic body 2, and thus an interlocked connection in the manner of a dovetail. The carrier profile 6 is therefore held firmly against the basic body 2 even under the action of a centrifugal force at higher rotation speeds, and radial displacement that would lead to "lifting" of the disk carrier 5 is prevented. By virtue of frictional locking in the area of the dovetail joint, at the same time the disk carrier 5 is fixed in the axial direction relative to the basic body 2, and thus onto the ring gear 7.

INDEXES

1 Ring gear carrier
1*a* Disk
1*b* Flange
2 Basic body
3 Inner teeth
4 Driving teeth
4*a* Tooth
4*b* Tooth base
4*c* Tooth bottom
5 Disk carrier
6 Driving profile
6*a* Tooth profile
6*b* Tooth flank
6*c* Tooth tip
6*c*' Tooth tip (after deformation)
6*d* Projection
6*e* Projection
7 Ring gear
8 Undercut (notch)
9 Undercut (notch)

The invention claimed is:

1. A component comprising:
a basic body (2) provided with radially inwardly facing inner basic body teeth (3) along an inner circumference of the basic body (2) and a radially outwardly facing driving tooth array (4, 4*a*) along an outer circumference of the basic body (2),
a sheet component (5) provided with a driving profile (6) having radially outwardly facing outer teeth and radially inwardly facing inner teeth (6*a*), and the driving profile substantially entirely encases an outer circumference of the basic body (2);
the sheet component (5) being connected to the basic body (2), via the outwardly facing array engaging with the driving profile, by positive interlock in both a tangential direction and a radial direction;
the sheet component (5) being mechanically connected to the basic body (2) by deformation of the driving profile
the driving tooth array (4, 4*a*) at least partially engages with the driving profile (6);
the driving tooth array (4) is formed by basic body outer teeth (4*a*), and each basic body outer tooth has at least one of a back-tapered area and an undercut area (8, 9); and
the driving profile (6) forms a dovetail shade in an area of a tip of a radially inner projection (6*c*', 6*d*, 6*e*) thereof, the driving profile forms a continuous unitary covering along a side of a first basic body outer tooth, in a first undercut area, across a bottom adjacent to both the first basic body outer tooth and a second basic body outer tooth, in a second undercut area, and along a side of the second basic body outer tooth.

2. The component according to claim 1, wherein the at least one of the back-tapered and the undercut area (8, 9) is located at a base (4b) of the basic body outer teeth.

3. The component according to claim 1, wherein the driving profile (6) mates with a contour of the basic body outer teeth (4a) and fills the undercut areas (8, 9) via the positive interlock, frictionally locks the sheet component to the basic body in both the tangential and the radial directions.

4. The component according to claim 1, wherein
the driving tooth array (4) is formed as a plurality of groups of tooth arrays spaced from one another along an outer circumference of the basic body (2) by at least a full width of a single tooth;
the base body (2) comprises a machined metal; and
the at least one of the back-tapered and the undercut areas (8, 9) are crevices that project into the basic body outer teeth (4a), and an exterior surface of the at least one of the back-tapered and the undercut areas (8, 9) engage with protrusions (6d, 6e) of the driving profile.

5. The component according to claim 1, wherein the sheet component is a disk carrier (5) of a shifting element, the positive interlock is an press interference fit, and the disk carrier forms a continuous unitary ring around a circumference of the basic body (2).

6. The component according to claim 1, wherein the component is a ring gear (7) of a planetary transmission.

7. The component according to claim 1, wherein the basic body (2) is made of a case-hardening material.

8. The component according to claim 1, wherein the driving profile (6, 6a, 6b, 6c') is approximately trapezium-shaped.

9. The component according to claim 1, wherein the component comprises a ring gear support (1).

10. The component according to claim 9, wherein the ring gear support (1) is a sheet component.

11. The component according to claim 9, wherein the ring gear support (1) has an annular flange (1b) which is connected, with a positive interlock, to the basic body (2).

12. A component comprising:
a basic body provided with radially inward facing inner teeth along a radially inner circumference of the basic body and radially outward facing outer teeth located about a circumference of the basic body;
a disc carrier provided with a driving profile (6) having radially outward facing outer teeth and inward facing teeth, and the driving profile mating with the radially outward facing outer teeth of the basic body;
the disc carrier being connected to the basic body at least by positive interlock of the radially outward facing outer teeth of the basic body with the radially inward facing teeth of the driving profile of the disc carrier;
the basic body (2) comprising a machined metal;
a ring gear carrier (1) with a central through hole being connected to the base body (2), via a fixing flange (1b), such that the ring gear carrier (1) being mechanically axially fixed with respect to the base body (2), but freely rotatable with respect to the base body (2), and the central through hole being radially interior to the radially inward facing teeth of the basic body; and
each radially outward facing tooth of the basic body having at least one of a back-tapered area and an undercut area (8, 9).

* * * * *